Jan. 24, 1967 R. ADLER 3,300,728

QUADRUPOLE PARAMETRIC AMPLIFIER WITH GRADUAL PUMP TRANSITION

Filed Nov. 29, 1963 2 Sheets-Sheet 1

INVENTOR.
Robert Adler
BY
Hugh H. Drake
Atty.

Jan. 24, 1967 R. ADLER 3,300,728

QUADRUPOLE PARAMETRIC AMPLIFIER WITH GRADUAL PUMP TRANSITION

Filed Nov. 29, 1963 2 Sheets-Sheet 2

INVENTOR.
Robert Adler
BY
Hugh H. Drake
Atty.

United States Patent Office 3,300,728
Patented Jan. 24, 1967

3,300,728
QUADRUPOLE PARAMETRIC AMPLIFIER WITH GRADUAL PUMP TRANSITION

Robert Adler, Northfield, Ill., assignor to Zenith Radio Corporation, Chicago, Ill., a corporation of Delaware Filed Nov. 29, 1963, Ser. No. 326,737
5 Claims. (Cl. 330—4.7)

The present invention pertains to cyclotron-wave electron beam devices. This application is a continuation-in-part of copending application Ser. No. 34,961, filed June 9, 1960, now abandoned in favor of divisional application Ser. No. 563,622, filed June 13, 1966, and a continuation-in-part and consolidation application Ser. No. 557,218, filed June 13, 1966, all by Robert Adler and assigned to the same assignee as the present application.

Recent years have seen the noise figure of amplifiers, especially in the microwave region, reduced decibel by decibel until, today, the noise figure is no longer measured in decibels but in degree Kelvin. The improvements in the reduction of excess noise have been brought about by devices such as the low-noise traveling-wave tube, the maser, the varactor-diode and electron-beam parametric amplifiers and the tunnel diode. Each of these now well-known devices is finding application in specific fields, the particular device utilized in a specific field depending upon the special characteristics demanded by that field.

Among the disadvantages of different ones of the devices with respect to possible utilization in different ones of the specific fields are: the need for cryogenic equipment, for microwave frequency pumps, and for circulators; exacting requirements for good input match, mechanical precision and perfection in electron gun construction, and high operating voltages; the solid-state devices are susceptible to burn out by large signals and the parametric devices have spurious outputs due to the presence of pump and idler frequencies. An overall object of the invention claimed in said consolidation application is to provide a simple device which avoids these disadvantages while yet retaining the ability to amplify with low noise.

The aforesaid copending consolidation application is addressed to techniques for cooling an electron beam where "cooling" refers to a decrease in the noise power associated with a beam immersed in a magnetic field as is characteristic of transverse-mode type electron beam devices. Cooling or decreasing the noise power of the electron beam in such a device is advantageous to certain signaling systems. For example, low noise transverse-mode amplifiers of the parametric, traveling-wave and similar types can be improved significantly in respect of noise through the application of the beam-cooling technique.

The noise power $P_{noise}$ propagating in the fast or slow cyclotron modes at a frequency $\omega$ and with an electron beam traveling in a uniform magnetic field is given by the following expression:

$$\left|P_{noise}\right|=\frac{\omega}{\omega_c}kT_c\Delta f \qquad (1)$$

where $\omega_c$ is the cyclotron frequency, $k$ is Bolzmann's constant, $T_c$ is the cathode temperature, and $\Delta f$ is the bandwidth in cycles per second. The effective beam noise temperature is expressed by the term $$\left(\frac{\omega}{\omega_c}T_c\right)$$

from which it can be seen as the cyclotron frequency increases the effective beam noise temperature decreases.

However, an increase of the cyclotron frequency in the signal coupling and amplifying regions of such electron beam devices can in many cases lead to other disadvantageous results. For example, in the conventional slow-wave amplifier, an increase in cyclotron frequency decreases the gain of the device. As disclosed in the aforesaid copending consolidation application, however, the increased cyclotron frequency need exist only in the vicinity of the cathode and may be reduced in a direction downstream from the cathode to a value more suitable for coupling to the fast or slow cyclotron wave.

Generally speaking, the noise power carried by a cyclotron wave is not conserved in a spatially varying magnetic field. Accordingly, it is instructive to examine the conditions under which the available noise power at any given signal frequency remains the same as that at the cathode. The power P propagating on a fast or slow cyclotron wave at a frequency $\omega$ is given by the expression:

$$P=\frac{\omega}{\omega_c}\frac{I_o}{2\eta}V_T^2 \qquad (2)$$

where $I_o$ is the beam current, $V_T$ is the tangential velocity associated with the electron motion, and $\eta$ is the ratio of electron charge to electron mass. Since the tangential velocity of an orbiting particle is the product of the radius and angular frequency of motion, Equation 2 can be rewritten as follows:

$$P=\frac{I_o}{2\eta}\omega\omega_c r^2 \qquad (3)$$

where $r$ is the radius of orbital motion.

Assuming, then, that the noise power is propagating in a region over which the magnetic field varies, $\omega_c$ necessarily will vary proportionally. Consequently, the noise power can remain constant only if the radius varies in a manner satisfying the following expression:

$$\omega_c r^2=\text{constant} \qquad (4)$$

Multiplying this by $\frac{1}{2}m$ and, for convenience, $\omega_c/\omega_c$, we obtain:

$$\frac{\frac{1}{2}m\omega_c^2 r^2}{\omega_c}=\text{constant} \qquad (5)$$

where $m$ is the electron mass.

Equation 5 defines the ratio of rotational kinetic energy to the frequency of rotation.

From Equation 5, it can be seen that if the ratio of rotational kinetic energy to the cyclotron frequency remains constant during a change in the strength of the magnetic field, the noise power of the beam will remain constant. If this condition is met throughout the beam path, the noise power at the signal frequency $\omega$ will remain the same as it was at the cathode. The ratio of the energy in a system to its frequency of oscillation is called the adibatic invariant. It has long been known that this ratio, which represents the number of quanta stored, remains constant if the frequency-determining parameters of a system are varied only gradually. In various embodiments described in the aforesaid copending consolidation application, the magnetic field is reduced along the beam path very gradually over a comparatively long distance. In certain applications, this is undesirable because it results in long tube lengths and results in somewhat reduced flexibility in design and manufacture. Said consolidation application, therefore, also discloses and claims cyclotron-wave electron beam devices in which the aforenoted disadvantages are overcome and which yield improved performance while operating at minimal beam powers. The present invention is described herein in connection with such devices.

In accordance with a feature of the present invention, a low noise cyclotron-wave amplifier for amplifying signal energy carried on an electron beam includes a pump structure which has a plurality of electrodes energized to develop a periodic inhomogeneous field to which the electrons are subjected. The strength of the inhomogeneous field increases gradually in the direction of electron flow at least over the initial upstream portion of the field.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figures 1, 6:
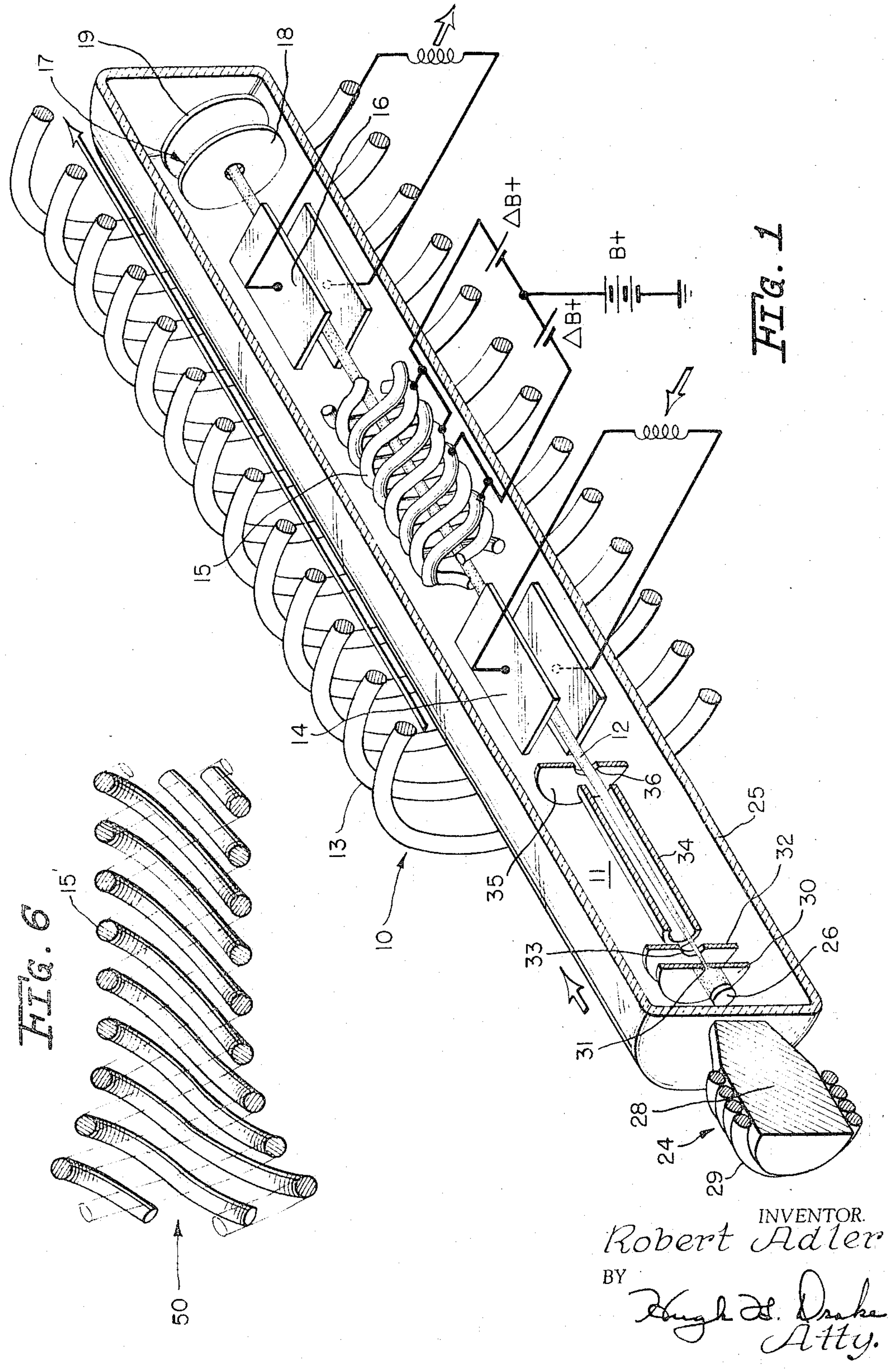
FIGURE 1 is a semi-diagrammatic, perspective view, partially broken away, of an electron beam device.
FIGURE 6 is a fragmentary perspective view of an alternative form of a portion of the FIGURE 1 device.

As shown in FIGURE 1 electron beam device 10 is a D.C.-pumped parametric amplifier. It includes an electron gun 11 for projecting a stream or beam of electrons along a path or axis 12. Encircling path 12 over a given portion of its length beyond electron gun 11 is a solenoid 13 which develops a homogeneous magnetic field through which the electron beam is projected parallel to the flux lines. Solenoid 13 establishes a condition of cyclotron resonance for the electrons.

An input-signal Cuccia coupler 14 is disposed first along the beam path following the electron gun. The application of input signal energy across the electrodes of coupler 14 causes the electrons to follow helical orbits around axis 12 with a periodicity determined by the strength of the homogeneous field from solenoid 13 and with a radius proportional to the input signal amplitude.

Downstream from coupler 14 is a twisted-quadrupole D.C.-pumped type of electron motion expander 15. It is composed of a quadrufilar helix wound around axis 12 with a pitch substantially equal to that of the electron orbits. Expander 15 subjects the electrons to a periodic inhomogeneous field. In this instance, the field itself is static as seen by an external observer, but as viewed by the moving electron its polarity reverses four times for every cyclotron orbit. That is, it defines a spatial periodicity equal to twice the cyclotron resonance period.

Downstream from pump section 15 is an output Cuccia coupler 16 which in use is coupled to a load. Coupler 16 operates inversely to input coupler 14 and extracts the amplified signal energy from the electron beam.

Spaced beyond output coupler 16 is a collector 17. The latter preferably is constructed with a first apertured electrode 18 which depresses the D.C. field gradient and which is followed along the beam path by an anode electrode 19 which actually receives the spent electrons.

The general operation of device 10 is now well known. Its manner of performance was analyzed and described in an article entitled "The D.C. Pumped Quadrupole Amplifier—a Wave Signal Analysis," by A. E. Siegman, which appeared at pages 1750–1755 of the October 1960 issue of the "Proceedings of the I.R.E." The principles involved were outlined in an article entitled "The Quadrupole Amplifier, a Low-Noise Parametric Device," by R. Adler et al., which appeared at pages 1713–1723 of the October 1959 issue of the "Proceedings of the I.R.E." Quite briefly, the orbiting electrons which leave input coupler 14 are subjected in twisted quadrupole 15 to field forces having the proper direction so as to cause additional energy to be imparted to the moving electrons. In the particular case of the D.C. pump, the D.C. energy which effects translation of the electrons along beam path 12 is converted by the inhomogeneous quadrupole field to rotational kinetic energy of the electrons.

As explained more fully in the aforesaid Adler et al article, energy may appear in the electron beam in either the fast or slow cyclotron wave. The electron waves are a function of the pattern of all of the electrons together. The instantaneous amplitude of the beam "envelope" is what is seen by the couplers. The beam noise power of principal concern in this instance is that which is, in either or both the slow and fast waves, the result of thermal velocity imparted to the electrons at the cathode. It is conventional to define the noise power in terms of beam temperature, and at the cathode in device 10, the temperature may be about 1000° K. As mentioned in the introduction, the aforesaid copending consolidation application teaches the establishment of a field in the vicinity of the cathode having a strength substantially higher than that developed within solenoid 13. Similarly in the present case, an electromagnet 24 is disposed outside the envelope 25 which encloses the evacuated space through which beam path 12 extends. Electromagnet 24 is located close to the end of envelope 25 and immediately opposite the cathode 26 in electron gun 11.

Electromagnet 24 develops a highly concentrated field in the vicinity of cathode 26. As part of the invention claimed in said consolidation application, it has been discovered that the effective rate of change of the magnetic field strength from the cathode vicinity to the end of the electron gun immediately upstream from coupler 14 should be no greater than about 1.5 percent per radian of electron orbital motion. This, then, corresponds to a change of about 10% per orbit. To this end, electromagnet 24 is shaped and electron gun 11 is constructed to effect the field strength reduction in the downstream direction.

Electromagnet 24 has a soft iron pole piece or core 28 of generally cylindrical shape but tapered conically toward axis 12 over its end portion adjacent the envelope at an angle selected so that the flux lines in the vicinity of the cathode developed by the electromagnet have a shape defining the required rate of change in field strength. The flux from electromagnet 24 is developed by a winding 29 wrapped about the circumference of core 28 and energized with direct current.

Electron gun 11 includes an anode electrode 30 immediately downstream from cathode 26 and having an aperture 31 centered on beam path 12. Immediately downstream from electrode 30 is a focus electrode 32 having an aperture 33 centered on path 12. Next along path 12 is a cylinder 34 coaxial with the path and defining a drift region. At the downstream end of the drift region is another focus electrode 35 having an aperture 36 centered on beam path 12.

In a successful tube constructed as shown in FIGURE 1, the beam voltage in the input Cuccia coupler is about 6 volts, the beam current is 15 microamperes, and the diameter of the beam projected from electron gun 11 is 0.015 inch; the Brillioun limit for such a beam is 22 microamperes. In traveling through drift cylinder 34, the beam expands approximately ten times in area as it diverges under the influence of the added field from electromagnet 24. In electron gun 11, the cathode-anode region is a space-charge-limited diode which operates with a cathode current density of about 120 milliamperes per square centimeter, the operation in the diode being at about 25 volts and 2 milliameperes. Aperture 31 in anode 30 is of substantially smaller cross-sectional area than the initial beam cross-section. In this tube, aperture 31 was 0.005 inch in order to select only the desired 15 microamperes final beam current.

Focus aperture 33 is larger than aperture 31 by an amount selected to cancel the negative lens formed by the cathode-anode elements, so that the electrons enter the drift region moving substantially parallel to axis 12.

In the drift region, the electrons travel under an accelerating voltage of about 5 volts and expand to the final diameter of 0.015 inch. Focus aperture 36 located at the downstream end of the 0.040 inch diameter drift cylinder permits final focusing of the electron beam. In the described tube, the surface of cathode 26 is approximately 0.125 inch from the pole face of core 28.

Figures 2, 5:
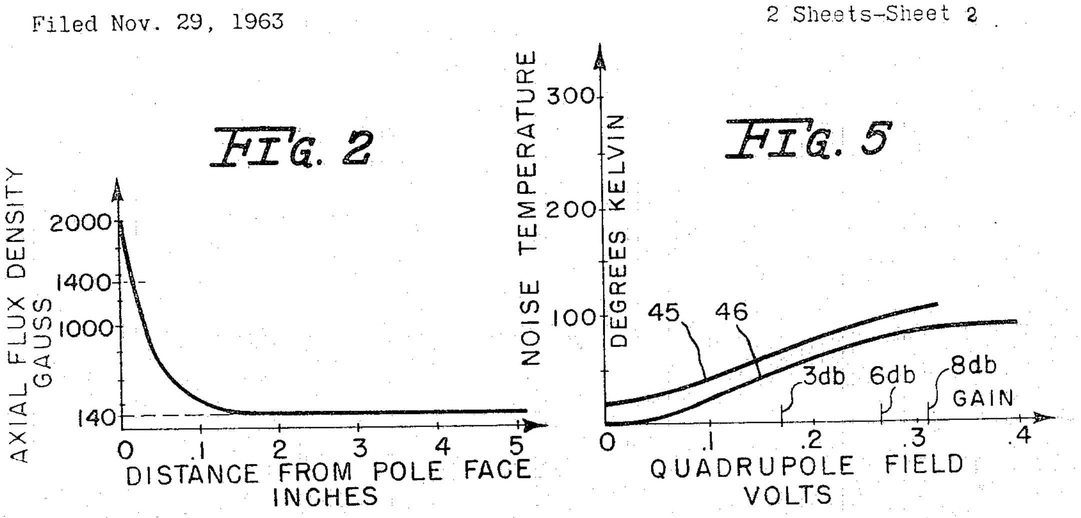
FIGURE 2 is a graph illustrating flux density variation in a portion of the device of FIGURE 1.
FIGURES 4 and 5 are graphs depicting still further operational characteristics of a device like that in FIGURE 1.

FIGURE 2 depicts the flux density variation in the tube from the pole piece in a direction along axis 12. The flux density at the cathode is 1400 gauss as compared with a flux density within solenoid 13 of 140 gauss. The field from solenoid 13 begins approximately 2 inches from the pole face. Hence, the ratio of flux density at the cathode to that at the input coupler is 10.

Figures 3, 4:
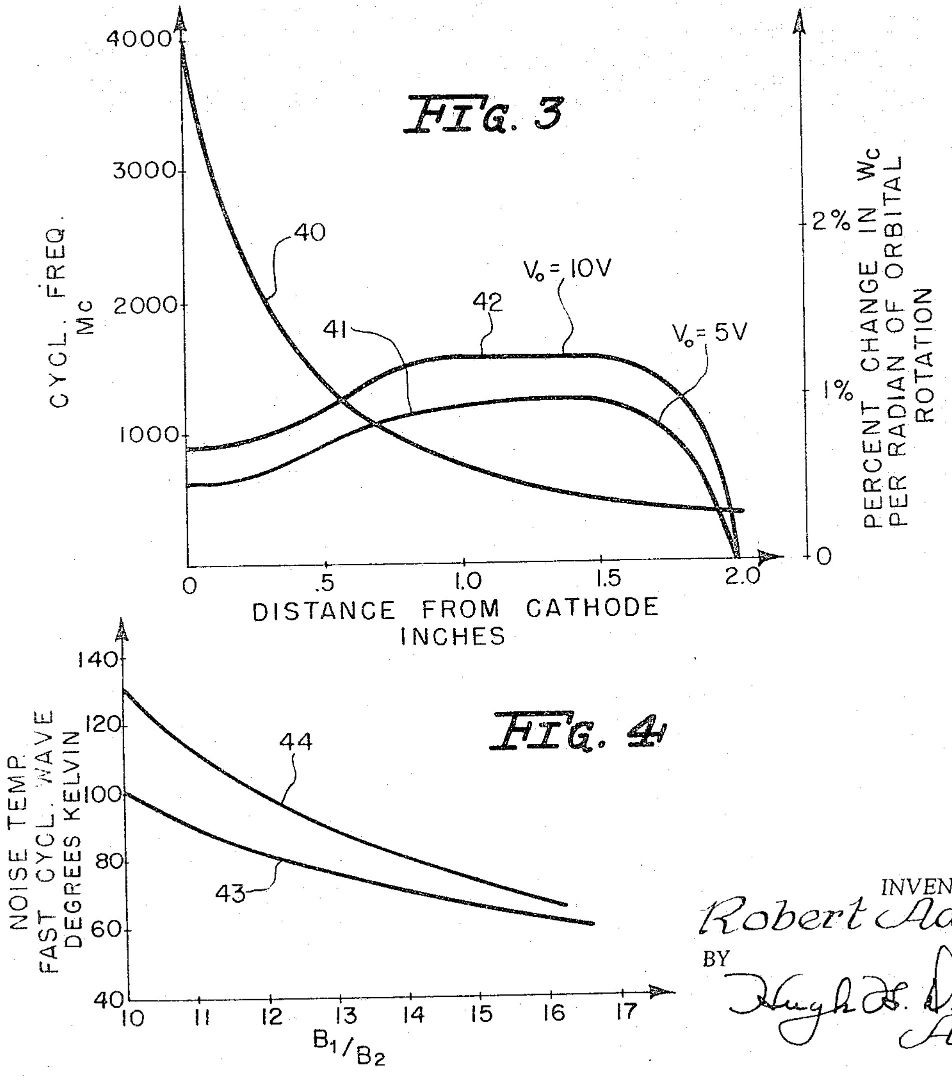
FIGURE 3 is a graph illustrating further operational characteristics of the device shown in FIGURE 1.

Curve 40 in FIGURE 3 depicts the change in cyclotron frequency in a direction downstream beginning from cathode 26. Curve 40 has a shape closely approximating that of a hyperbola. Curves 41 and 42 (associated with the right hand ordinate) depict the percentage change of the cyclotron frequency per radian of electron motion for drift velocities in the region defined by cylinder 34 and corresponding to 5 volts and 10 volts, respectively. It will be noted that the magnetic distribution, and the corresponding change in cyclotron frequency, is smooth and that the rate of change of cyclotron frequency does not exceed 1.5 percent per radian.

FIGURE 4 depicts the fast-wave noise temperature as a function of the ratio of the flux density $B_1$ in the vicinity of the cathode to the flux density $B_2$ within solenoid 13. Curve 43 represents the theoretical noise temperature, while curve 44 is a plot of the measured beam temperature, corrected for coupler losses. It will be observed that a noise temperature lower than 130° is actually obtained with a flux strength ratio of 10 and that the noise temperature is still further reduced to a value of 68° K. with a strength ratio of 16. The latter temperature corresponds to a noise figure of 0.92 db. Consequently, with small input losses, which reasonably can be of the order of 0.25 db, terminal noise figures close to 1 db are possible with a 16:1 ratio of flux strengths.

FIGURE 5 depicts actual and theoretical noise temperatures as measured at the output coupler, thereby giving an indication of the effect of synchronous-wave noise converted to the fast cyclotron wave. Curve 45 is a plot of measurements with the actual structure mentioned above and depicts the noise temperature, corrected for coupler losses, as a function of quadrupole field potential which in turn is related to gain in the amplifier. It will be noted that the beam noise temperature is extremely small at zero gain and rises to perhaps 120° K. at 8 db gain. Curve 46 depicts the calculated noise temperature for this measurement. The two curves are quite similar.

Observing both FIGURES 4 and 5, it is apparent that operating in accordance with the characteristics defined herein enables a substantial reduction in both the slow and fast wave noise temperatures. Since this is a function essentially entirely of the characteristics in the electron gun region, it is equally apparent that the technique is applicable to any kind of slow or fast wave amplifier, including conventional transverse field traveling wave tubes.

As mentioned with respect to FIGURE 3, the desired decrease in cyclotron frequency with increasing distance from the cathode follows a curve approximating a hyperbola. In analyzing the development of the flux distribution curve, it is useful to compute the fractional change of field $\Delta\omega_c/\omega_c$ per radian of orbital rotation. For convenience, this will be denoted by the symbol D. One radian of orbital rotation occurs over a distance $\Delta z$, where $$\Delta z=\frac{u_o}{\omega_c} \qquad (6)$$

and where $z$ represents distance along axis 12 in the Z direction and $u_o$ is the drift velocity of the electrons. $\Delta z$ is the distance over which the ratio $\Delta\omega_c/\omega_c$ is to remain below 0.015. Since $d\omega_c/dz$ is the change in cyclotron frequency per unit length, the change in cyclotron frequency $\Delta\omega_c$ over the length $\Delta z$ is expressed as follows:

$$\Delta\omega_c=\frac{d\omega_c}{dz}\cdot\frac{u_o}{\omega_c} \qquad (7)$$

and therefore:

$$D=\frac{\Delta\omega_c}{\omega_c}=\frac{d\omega_c}{dz}\cdot\frac{u_o}{\omega_c^2} \qquad (8)$$

A curve of $\omega_c$ as a fraction of $z$ which renders the right hand term of Equation 8 equal to a constant, which as mentioned above is less than 0.015, is a simple hyperbola for K*e* case that the drift velocity $u_o$ is constant.

In addition to the aforementioned fast and slow cyclotron waves which exist on the electron beam, it is also known that there are synchronous waves. Reduction of the axial magnetic field strength in too short a distance along the beam path can lead to active coupling between the cyclotron and synchronous waves, with resultant deleterious effects upon the noise temperature. This active coupling between an initial synchronous wave and the cyclotron wave is due to the radial component of the diverging axial magnetic field.

The quantity D is always negative for decreasing fields and is proportional to a vector which represents the incremental cyclotron wave generated at a point by active coupling to a given synchronous wave. The cumulative amount of noise power coupled from a synchronous wave to the cyclotron wave varies periodically through maximums and minimums as a function of distance along the beam path. Consequently, the electron velocity $u_o$ may be adjusted to make the null in this variation fall at the end of the changing-field region; this has the effect of rendering the change of field negligible upon the noise coupling properties. However, in practice it is difficult to achieve such an adjustment. Consequently, it is contemplated to utilize other than a simple hyperbolic change of field strength. For example, the field strength may change gradually at first in the direction away from the cathode, then follow a hyperbolic function, and finally again flare out gradually. This approach tends to render the noise power coupling negligible.

The above discussion and development of the quantity D leads to simple analysis with a hyperbolically decreasing field strength, since the quantity D is constant with distance and a curve of D as a function of $z$ is a straight line. Other field distributions may require considerably greater complexity in mathematical analysis. However, a principle to be followed in any case is the assigning of parameters so that the quantity D effectively has a value which is less than a specified maximum. A higher actual maximum value of D, or even a higher average D, may be permissible for the case of a gradual changing field than for a field which is hyperbolic throughout; but an effective value of D is defined as that which indicates an equivalent limitation upon the amount of undesirable noise coupling regardless of the distribution of the field. For this reason, it is appropriate to speak of the change in field in terms of its effective rate of change.

As a general statement about the quantity D under the assumption that the drift velocity $u_o$ is constant throughout the region of changing magnetic field: the area under a curve of D as a function of $z$ depends only on the initial and final values of $\omega_c$ and does not depend on the specific manner in which the field changes between these two terminal values. This is true because D is equal to the negative of the product of $u_o$ times the derivative of the reciprocal cyclotron frequency with respect to distance, or:

$$D=-u_o\frac{d}{d_z}\left(\frac{1}{\omega_c}\right) \qquad (9)$$

Integrating over the decreasing field region, $$\int_{Z1}^{Z2} D\,dz = \left[ -u_o \frac{d}{dz}\left(\frac{1}{\omega_c}\right)\right]_1^2 = -u_o\left(\frac{1}{\omega_{c2}} - \frac{1}{\omega_{c1}}\right) \quad (10)$$

Consequently, the average value of D is:

$$D_{av} = \frac{-u_o\left(\frac{1}{\omega_{c2}} - \frac{1}{\omega_{c1}}\right)}{z} \quad (11)$$

Having selected the distribution of field desired, in order to minimize noise power coupling, for example, it remains necessary only to compute the distance $z$ over which the field is to decrease. Rearranging Equation 11, $$z = \frac{-u_o\left(\frac{1}{\omega_{c2}} - \frac{1}{\omega_{c1}}\right)}{D_{av}} \quad (12)$$

Adjustment of the field distribution may be achieved by the use of any of a number of known field compensation techniques. Additional aiding or bucking windings may be included on core 28 or around the tube envelope. Small coils or permanent magnets may be placed about the circumference of the envelope to compensate for undesired variations or purposefully to cause variations in the field patterns created by magnet 24 and solenoid 13. Where practical, the entire magnetic field may be supplied by a permanent magnet structure shaped and magnetized to provide the desired field configuration.

In accordance with a feature of the invention, the operating performance is improved by forming the pump section or expander so that the inhomogeneous field established across the beam path increases in intensity over at least the initial portion of the expander section. To this end, as illustrated in FIGURE 6, the electrodes of quadrupole 15′ are flared out at the upstream end 50 of the quadrupole section. Consequently, the transition into the quadrupole region is gradual and smooth, avoiding perturbations of the electron motion.

Optimization of performance is achieved by biasing the twisted quadrupole D.C. pump structure in a manner permitting the pump electrodes also to be used for centering of the beam. To this end, the pump electrodes are biased by connection across a primary potential source B+ and, in addition, each pair of like-polarized electrodes are further biased by an adjustable potential source ΔB+ connection in series between that pair and primary source B+. Adjustment of the potential of the ΔB+ sources permits the beam to be accurately centered within expander 15 so that maximum gain may be obtained without interception by the expander electrodes. A still further degree of adjustment flexibility may be achieved by providing individual external connections to each of the four quadrupole electrodes and utilizing individual adjustable potential sources, in combination with a primary source as in FIGURE 1 if desired, for each of the quadrupole electrodes.

Amplifiers built as described are usable over a wide range of frequencies. Practical success is already indicated, for example, from 400 megacycles to L-band. In certain models, still further simplification is obtained by disposing the pole piece behind the cathode but inside the evacuated envelope in a manner that it forms an integral part of the tube structure. A permanent magnet is used behind the pole piece to provide a high intensity field at the cathode.

An interesting aspect of the entire device is that its noise figure is predictable and can be made as low as desired by making the magnetic field at the cathode correspondingly high. Even at extremely high signal frequencies the predictability remains. The embodiments described illustrate that even a tiny cathode emersed in a high magnetic field can generate a low-noise electron beam. The device is a practical low-noise UHF amplifier which achieves, without a radio-frequency pump, the low-noise performance normally expected of parametric devices. The amplifier does not require near-perfect match at the input; yet, it retains all the properties of immunity to burn out, excellent phase linearity, perfect unilateral behavior and the stability which is characteristic of unilateral devices. It also is a single-channel amplifier.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An electron beam amplifier comprising: a cathode for projecting an electron beam along a predetermined path; means for developing a magnetic field along said path and of a predetermined strength to establish a condition of cyclotron resonance for electrons in said beam; means disposed along said path for coupling signal energy to said beam; means disposed along said path for extracting amplified signal energy from said beam; and a pump structure disposed effectively between said coupling and extracting means and which develops a periodic inhomogeneous field to which the electrons are subjected and which varies at a rate at which the electrons encounter four field reversals for each orbit of their cyclotron motion, the strength of said inhomogeneous field increasing gradually in the direction of electron flow at least over the initial, upstream portion of said field.

2. An amplifier as defined in claim 1 in which said pump structure comprises a plurality of circumferentially-spaced electrodes individually flared outwardly from said path over the upstream end portion of the pump structure.

3. An amplifier as defined in claim 2 in which said electrodes together constitute a quadrifilar helix.

4. An amplifier as defined in claim 3 in which adjacent ones of said electrodes are coupled to opposite sides of a unidirectional potential source.

5. An amplifier as defined in claim 4 in which said unidirectional potential source is composed of a pair of additively series-connected individual voltage sources together with a primary voltage source connected between a point intermediate said pair of sources and a plane of reference potential.

References Cited by the Examiner

UNITED STATES PATENTS 3,122,709 2/1964 Ashkin ............ 330—4.7

ROY LAKE, *Primary Examiner.*

DARWIN R. HOSTETTER, *Assistant Examiner.*